United States Patent [19]

Gil et al.

[11] Patent Number: 5,148,825
[45] Date of Patent: Sep. 22, 1992

[54] MOISTURE-RESPONSIVE VALVE

[75] Inventors: Jacob Gil, 7 Hachavatselet Street, Kiron; Zvi Rubenstein, Timrat, both of Israel

[73] Assignees: Plastro-Gvat, Kibbutz Gvat; Agroteam Consultants Ltd., Migdal Haemek; Jacob Gil, Givat Shmuel, all of Israel

[21] Appl. No.: 795,137

[22] Filed: Nov. 20, 1991

[51] Int. Cl.5 ............................................ A01G 27/00
[52] U.S. Cl. .................................. 137/78.3; 137/529; 239/63
[58] Field of Search ................... 239/63; 137/529, 78.3

[56] References Cited

U.S. PATENT DOCUMENTS

| | | | |
|---|---|---|---|
| 2,013,372 | 9/1935 | Work | 137/529 |
| 3,421,546 | 1/1969 | Jennings et al. | 137/529 |
| 3,874,590 | 4/1975 | Gibson | 137/78.3 |
| 4,095,458 | 6/1978 | Wild | 239/63 |
| 4,696,319 | 9/1987 | Gant | 239/63 |
| 4,922,945 | 5/1990 | Browne | 137/78.3 |

Primary Examiner—A. Michael Chambers
Attorney, Agent, or Firm—Benjamin J. Barish

[57] ABSTRACT

A moisture-responsive valve includes a water-swellable body within a housing adjacent a moisture-permeable wall thereof for controlling the movements of a valve member with respect to a valve seat in response to the moisture passing through the moisture-permeable wall. The valve member is floatingly mounted between a first spring interposed between the valve member and the housing and urging the valve member away from the valve seat, and a second spring interposed between the valve member and the water-swellable body and urging the valve member towards the valve seat.

20 Claims, 2 Drawing Sheets

MOISTURE-RESPONSIVE VALVE

FIELD AND BACKGROUND OF THE INVENTION

The present invention relates to a moisture-responsive valve, and particularly to such a valve for use in controlling the supply of water to plants in accordance with the moisture content of the soil in which the plants are grown.

Many moisture-responsive valves have been developed for use in water irrigation systems in order to control the supply of water to the plants in accordance with the moisture content of the soil. Such valves are widely used in irrigation systems wherein the water is supplied to the water irrigation devices periodically (e.g., water sprinklers), or continuously (e.g., water drippers), until the water content of the soil reaches a predetermined level, whereupon the supply of water is automatically terminated. Examples of known valves of this type are described in U.S. Pat. Nos. 4,648,555 and 4,696,319.

Such known moisture-responsive valves commonly include a moisture-swellable body which controls the flow. However, the known constructions generally do not permit the moisture-swellable body to expand to its limit. As a result, the moisture-swellable body may be subjected to a large force which can seriously degrade the body and substantially shorten its useful life.

OBJECT AND BRIEF SUMMARY OF THE INVENTION

An object of the present invention is to provide a moisture-responsive valve having advantages in the above respects. Another object of the invention is to provide a moisture-responsive valve which can be produced in volume and at low cost.

According to the present invention, there is provided a moisture-responsive valve, comprising: a housing formed with an internal chamber, an inlet fitting connectible to a source of water for inletting water into the chamber via a valve seat within the chamber, and an outlet opening for outletting water from the chamber; a valve assembly in the chamber including a valve member movable towards and away from the valve seat for controlling the flow of water through the valve seat into the chamber and out through the outlet opening; and a water-swellable body within the housing adjacent a moisture-permeable wall thereof for controlling the movements of the valve member in response to the moisture passing through the moisture-permeable wall; characterized in that the valve member is floatingly mounted between a first spring interposed between the valve member and the housing and urging the valve member away from the valve seat, and a second spring interposed between the valve member and the water-swellable body and urging the valve member towards the valve seat.

According to further features in the preferred embodiments of the invention described below, the housing includes a cylindrical section guiding the movement of the valve assembly towards and away from the valve seat. More particularly, the housing cylinder is open at one end facing the valve seat and is closed at its opposite end; and the valve member is movable within the open end of the housing cylinder between the first and second springs. The valve assembly further includes a base member movable within the closed end of the housing cylinder between the water-swellable body and the second spring.

Two embodiments of the invention are described below for purposes of example. In one described embodiment, the valve member is formed with a plurality of outer fingers engageable with the lower surface of the housing, which is in the form of a cap, for keep the valve member parallel to the valve seat; whereas in a second described embodiment, the outer diameter of the valve member is substantially the same as the inner diameter of the housing for guiding the movements of the valve member.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
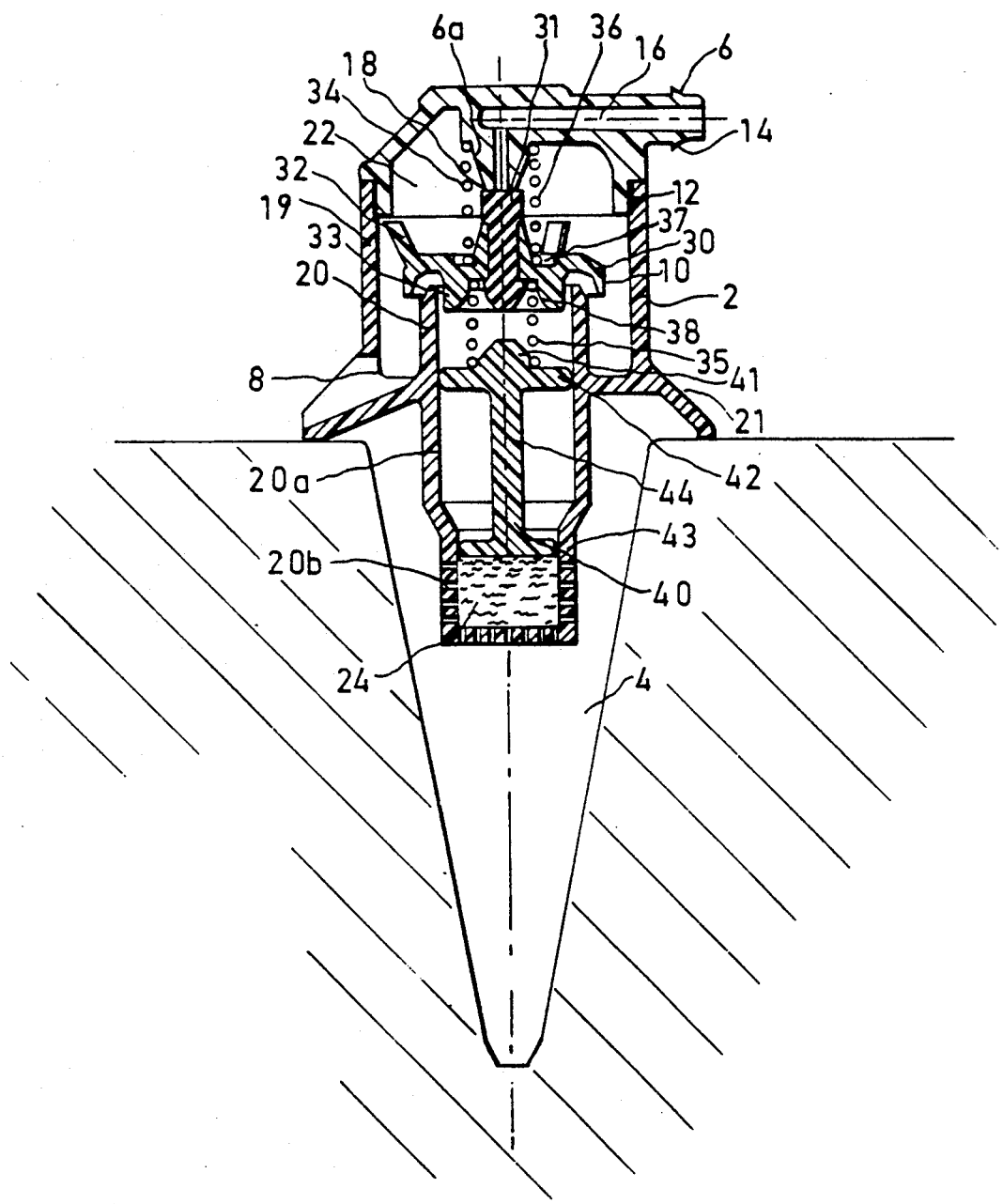
FIG. 1 is a longitudinal sectional view illustrating one form of moisture-responsive valve constructed in accordance with the invention.

The moisture-responsive valve illustrated in FIGS. 1 and 1a is intended for embedding in the soil for controlling the supply of water to a plant automatically in response to the moisture content of the soil in which the plant is grown. Thus, the valve comprises a housing, generally designated 2, secured to a ground stake 4 for embedding the housing in the soil; an inlet fitting 6 for connecting the valve to a source of water; an outlet opening 8 for feeding the water to the soil; and a valve assembly, generally designated 10, for controlling the feeding of the water to the soil in response to the moisture condition of the soil.

The inlet fitting 6 is in the form of a cap removably attached to the housing 2 by threads, shown at 12, to provide access into the interior of the housing. It includes an annular barb 14 for attachment to a water supply pipe (not shown), and a passageway 16 leading to a valve seat 18 cooperable with valve assembly 10.

Housing 2 includes an outer cylinder 19, an inner cylinder 20, and an annular skirt 21, all integrally formed with the ground stake 4. The two housing cylinders 19, 20 and the inlet fitting 6, define between them an internal chamber 22 containing the valve assembly 10. The annular skirt 21 is interrupted at one side to define the outlet opening 8 leading from chamber 22.

The housing inner cylinder 20 includes an upper section 20a of relatively large diameter, and a lower section 20b of smaller diameter water-swellable body 24 which swells when absorbing moisture from the soil. For this purpose, the lower section 20b of housing cylinder 20 is water-permeable to permit body 24 to absorb moisture from the soil. Valve assembly 10 carried at the upper section 20a of the inner housing cylinder 20 is cooperable with valve seat 18 of the inlet fitting 6 for controlling the inletting of water into chamber 22, in response to the height of the moisture-swellable body 24, and thereby through the outlet opening 8 to the soil.

Valve assembly 10 includes a valve member 30 adjacent the open end of the housing inner cylinder 20, and a base member, generally designatd 40, adjacent the closed end thereof. Valve member 30 carries an elastomeric sealing element 31 cooperable with valve seat 18 of the inlet fitting 6 to control the flow of water from the inlet fitting into chamber 22 and out through the outlet opening 8. The movements of valve member 30 towards and away from valve seat 18 are guided by a plurality (e.g., three) of outer fingers 32 engageable with the inner face of the outer housing cylinder 19.

Valve member 30 is floatingly mounted by a first coiled spring 34 interposed between the upper face of the valve member and inlet fitting 6 of the housing, and a second spring 35 interposed between the opposite face of the valve member and the base member 40 of the valve assembly. For this purpose, inlet fitting 6 is formed with a conical projection 6a circumscribing valve seat 18 and receiving one end of the spring 34; and the upper face of the valve member 30 is formed with a similar conical projection 36, circumscribed by an annular recess 37, for receiving the opposite end of spring 34. Similarly, the lower face of valve member 30 is formed with a conical recess 38 circumscribing the respective end of sealing element 31 for receiving one end of spring 35; and the upper face of base member 40 is formed with a conical projection 41 for receiving the opposite end of spring 35.

Base member 40 includes a section 42 of circular configuration having an outer diameter substantially equal to the inner diameter of the upper section 20a of housing cylinder 20, and at its opposite end another section 43 of circular configuration having a diameter substantially equal to the inner diameter of the lower section 20b of housing cylinder 20 containing the water-swellable body 24. Base member 40 further includes a rigid stem 44 integrally joining the two sections 42, 43 together.

The moisture-responsive valve illustrated in FIGS. 1 and 1a is used in the following manner:

The stake 4 of housing 2 is embedded in the soil so that the bottom of skirt 21 sits on the surface of the soil.

As the moisture content of the soil decreases, the water-swellable body 24, communicating with the soil via its moisture-permeable wall 20b, will shrink in volume, thereby lowering base member 40 of the valve assembly 10. Spring 34 will therefore lower the valve member 30 to move sealing element 31 away from valve seat 18, whereby water will flow from the inlet fitting 6, and valve seat 18, into chamber 22, and out through the outlet opening 8 to wet the soil.

As the soil moisture content increases, the volume of the water-swellable body 24 likewise increases, thereby moving base member 40 and valve member 30 towards the valve seat 18, until sealing element 31 of valve member 30 engages the valve seat to terminate the flow of water into chamber 22 and out through the outlet opening 8. However, because of the reaction time delay, body 24 still continues to increase in volume for a short interval, thereby continuing to raise base member 40, which firmly presses the sealing element 31 of valve member 30 against valve seat 18.

After a time, the moisture content of the soil decreases, causing the water-swellable body 24 also to decrease in volume. Initially, this decrease in volume merely releases the closing pressure applied by base member 40 against the valve member 30; but when the soil moisture content decreases sufficiently, the force applied by base member 40 and its coiled spring 35 is not sufficient to overcome spring 34, whereupon the latter spring moves the valve member 30 downwardly to cause its sealing element 31 to disengage from valve seat 18, thereby reopening the valve to the flow of water from inlet 6 into chamber 22 and out through the outlet opening 8.

It has been found that by floatingly mounting the valve member 30 between the two coiled springs 34 and 35, the water-swellable body 24, e.g., a gel, is permitted to expand without creating excessive pressure which degrades the gel and shortens its useful life.

Figure 2:
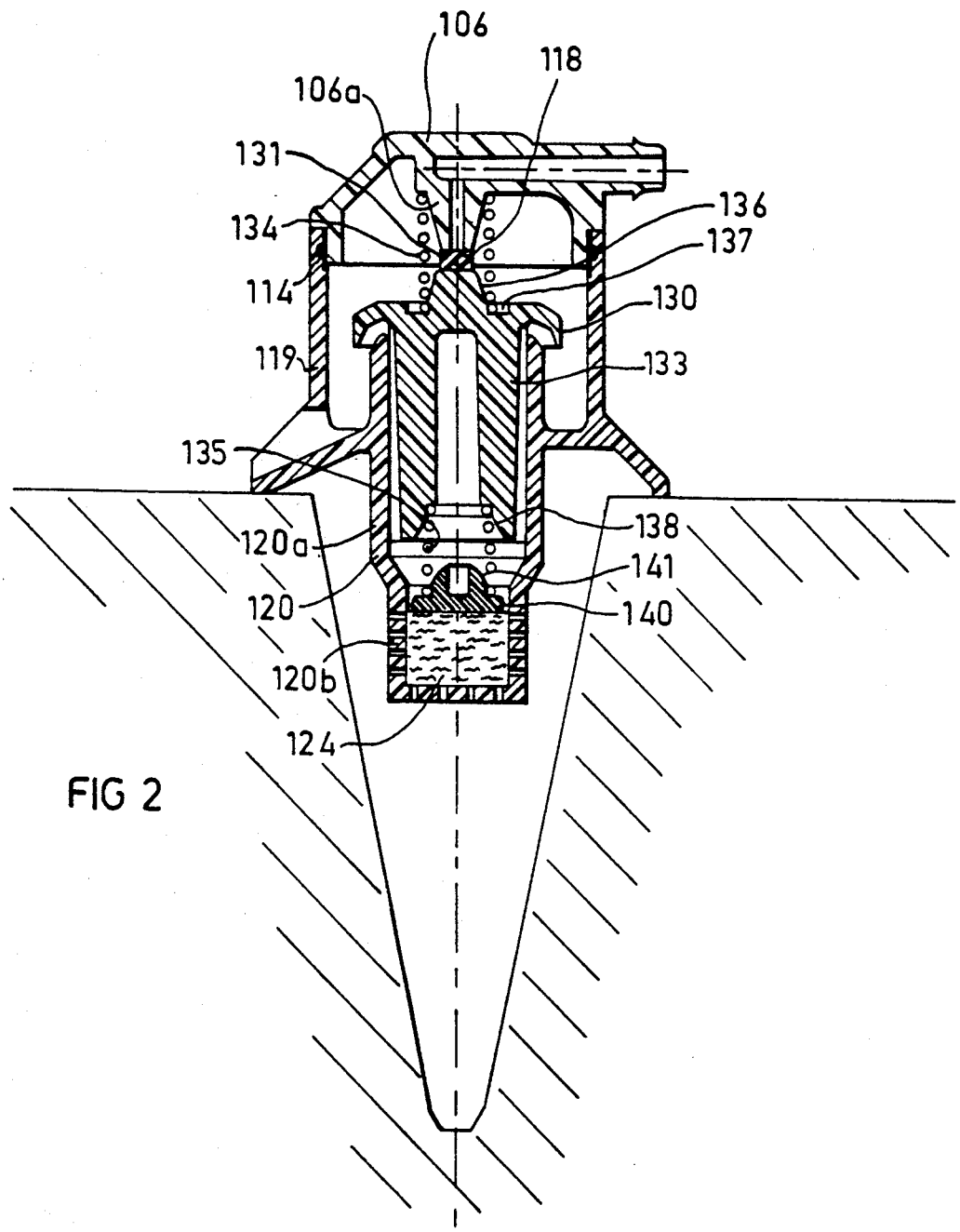
FIG. 2 is a longitudinal sectional view illustrating a second form of moisture-responsive valve constructed in accordance with the invention.

The moisture-responsive valve illustrated in FIG. 2 is of similar construction and operates in a similar maner as described above with respect to FIG. 1, with the following exceptions:

In the FIG. 2 construction, the valve member, therein designated 130, of the valve assembly, includes a cylindrical section 133 having an outer diameter substantially equal to the inner diameter of the upper section 120a of housing cylinder 120 so as to guide the movements of the valve member. In this case, the base member 140 is constituted of a circular disc of an outer diameter substantially equal to the inner diameter of the lower housing section 120b containing the water-swellable body 124, and is formed centrally of its upper surface with a conical projection 141 for receiving one end of the lower coiled spring 135. The opposite end of the coiled spring 135 is received within a conical recess 138 formed in the lower end of section 133 of the valve member 130.

In addition, the sealing element 131 of valve member 130, cooperable with valve seat 118 of the inlet fitting 106, is in the form of a solid washer fixed to the upper face of the valve member, particularly to its conical projection 136 centrally of an annular recess 137. Recess 137 receives one end of the upper coiled spring 134, the opposite end of the coiled spring being received around a conical projection 106a formed with the valve seat 118.

A still further modification in the valve illustrated in FIG. 2, as compared to that of FIG. 1, is that the inlet fitting 106 is formed with an annular rib 114 adapted to be snap-fitted into an annular recess formed in the housing cylinder 119.

In all other respects, the construction and operation of the moisture-responsive valve illustrated in FIG. 2 are substantially the same as described above with respect to FIG. 1.

While the invention has been described with respect to two preferred embodiments, it will be appreciated that many variations, modifications and other applications of the invention may be made.

What is claimed is:

1. A moisture-responsive valve, comprising:
   a housing formed with an internal chamber, an inlet fitting connectible to a source of water for inletting water into the chamber via a valve seat within the chamber, and an outlet opening for outletting water from the chamber;
   a valve assembly in said chamber including a valve member movable towards and away from said valve seat for controlling the flow of water through the valve seat into said chamber and out through said outlet opening;
   and a water-swellable body within said housing adjacent a moisture-permeable wall thereof for controlling the movements of said valve member in response to the moisture passing through said moisture-permeable wall;

characterized in that said valve member is floatingly mounted between a first spring interposed between the valve member and the housing and urging the valve member away from said valve seat, and a second spring interposed between the valve member and the water-swellable body and urging the valve member towards said valve seat.

2. The valve according to claim 1, wherein said housing includes a cylinder guiding the movements of said valve assembly towards and away from the valve seat.

3. The valve according to claim 2, wherein said housing cylinder is open at one end facing the valve seat and is closed at its opposite end; said valve member being movable within the open end of the housing cylinder between said first and second springs; said valve assembly further including a base member movable within the closed end of the housing cylinder between said water-swellable body and said second spring.

4. The valve according to claim 3, wherein said valve member is formed with an annular flange of larger diameter than, and circumscribing, the open end of the housing cylinder.

5. The valve according to claim 3, wherein said valve member includes a sealing element centrally thereof engageable with said valve seat in the closed position of the valve member.

6. The valve according to claim 3, wherein the surface of the valve member facing the base member is formed with a conical recess centrally thereof for receiving one end of the second spring, and the surface of the base member facing the valve member is formed with a conical projection centrally thereof for receiving the opposite end of the second spring.

7. The valve according to claim 3, wherein said inlet fitting including the valve seat, and the
valve member facing the valve seat, are both formed with conical projections for receiving the opposite ends of said first spring.

8. The valve according to claim 3, wherein the housing cylinder is formed with a large-diameter section at its open end, and with a smaller-diameter section at its closed end, the latter section being formed with said moisture-permeable wall and containing said water-swellable body.

9. The valve according to claim 8, wherein said base member includes a section of circular configuration having an outer diameter substantially equal to the inner diameter of the large-diameter section of the housing cylinder such that the movements of the base member are guided thereby.

10. The valve according to claim 9, wherein said base member of the valve assembly includes a second section of circular configuration and having an outer diameter substantially equal to the inner diameter of the smaller-diameter section of the housing cylinder.

11. The valve according to claim 10, wherein the two sections of the base member are interconnected by a stem integrally formed with said two sections.

12. The valve according to claim 3, wherein said valve member is formed with a plurality of outer fingers engageable with the lower surface of a cap attached to the housing for guiding the movements of the valve member parallel to said valve seat.

13. The valve according to claim 3, wherein said valve member has a cylindrical section of an outer diameter substantially equal to the inner diameter of the open end of the housing cylinder; and the base member has a circular section of an outer diameter substantially equal to the inner diameter of the closed end of the housing cylinder.

14. The valve according to claim 1, wherein said inlet fitting is formed in a cap removably attachable to said housing.

15. The valve according to claim 1, wherein said housing is integrally formed with a ground stake for embedding same in the soil whose moisture is to be sensed for operation of the valve.

16. A moisture-responsive valve, comprising:
a housing formed with an internal chamber, an inlet fitting connectible to a source of water for inletting water into the chamber via a valve seat within the chamber, and an outlet opening for outletting water from the chamber;
a valve assembly in said chamber including a valve member movable towards and away from said valve seat for controlling the flow of water through the valve seat into said chamber and out through said outlet opening;
a water-swellable body within said housing adjacent a moisture-permeable wall thereof for controlling the movements of said valve member in response to the moisture passing through said moisture-permeable wall; end facing the valve seat and closed at its opposite end;
said valve member being movable within the open end of the cylinder between a first spring interposed between the valve member and the housing and urging the valve member away from said valve seat, and a second spring interposed between the valve member and the water-swellable body and urging the valve member towards said valve seat;
and a base member movable within the closed end of the housing cylinder between said water-swellable body and said second spring.

17. The valve according to claim 16, wherein said valve member includes a sealing element centrally thereof engageable with said valve seat in the closed position of the valve member.

18. The valve according to claim 16, wherein the surface of the valve member facing the base member is formed with a conical recess centrally thereof for receiving one end of the second spring, and the surface of the base member facing the valve member is formed with a conical projection centrally thereof for receiving the opposite end of the second spring.

19. The valve according to claim 16, wherein the housing cylinder is formed with a large-diameter section at its open end, and with a smaller-diameter section at its closed end, the latter section being formed with said moisture-permeable wall and containing said water-swellable body.

20. The valve according to claim 19, wherein said base member includes a section of circular configuration having an outer diameter substantially equal to the inner diameter of the large-diameter section of the housing cylinder such that the movements of the base member are guided thereby.

* * * * *